(12) United States Patent
Kharshan et al.

(10) Patent No.: US 8,440,095 B1
(45) Date of Patent: May 14, 2013

(54) ANTI-CORROSIVE CORN EXTRACTS

(75) Inventors: Margarita Kharshan, Little Canada, MN (US); Alla Furman, Shoreview, MN (US); Elizabeth Austin, Vadnais Heights, MN (US)

(73) Assignee: Cortec Corporation, St. Paul, MN (US)

( * ) Notice: Subject to any disclaimer, the term of this patent is extended or adjusted under 35 U.S.C. 154(b) by 0 days.

(21) Appl. No.: 13/465,262

(22) Filed: May 7, 2012

Related U.S. Application Data

(60) Provisional application No. 61/483,185, filed on May 6, 2011.

(51) Int. Cl.
*C09K 3/18* (2006.01)
*C23F 11/00* (2006.01)

(52) U.S. Cl.
USPC ......... 252/70; 106/13; 106/14.05; 106/14.11; 106/14.41; 106/14.44; 252/388

(58) Field of Classification Search ............... 106/13, 106/14.05, 14.11, 14.41, 14.44; 252/70, 388
See application file for complete search history.

(56) References Cited

U.S. PATENT DOCUMENTS

| | | | | |
|---|---|---|---|---|
| 5,876,621 | A * | 3/1999 | Sapienza ................. | 252/70 |
| 7,014,789 | B2 * | 3/2006 | Hartley et al. .......... | 252/70 |
| 7,566,469 | B2 * | 7/2009 | Scheimann .............. | 426/424 |
| 7,658,861 | B2 | 2/2010 | Koefod | |
| 2010/0092603 | A1 | 4/2010 | Bruinsma et al. | |

OTHER PUBLICATIONS

CC Technolovies, "Cost of Corrosion", webpage: http://www.corrosioncost.com. 2002.
Kansas Ethanol, "Clean Fuel from Kansas Farms", http://www.ksgrains.com/ethanol/ddgs/html. 2004.
Abdel-Gaber, A.M; And-El Nabey, B.S.; Sidahmed, I.M.;El-Zayady, A.M.; Saadawy M. "Effect of Temperature on Inhibitive Action of Damsissa Extract on the Corrosion of Steel in Acidic Media". Corrosion. 2003 62, Num 04. Abstract Only.
Odiongenyi, A.O. et al., "Corrosion Inhibition and Adsorption Properties of Ethanol Extract of Vernonia Amygdalina for the Corrosion of Mild Steel in H2SO4". Portugaliae Electrochimica Acta, 2009, 29(1), 33-45.
Selvi, J., et al., "Corrosion Inhibition by Beet Roote Extract", Portugaliae Electrochimica Acta, 2009, 29(1), 1-11.
Zhao, Weimin, et al., "Effects of Preparation Methods on Corrosion Inhibition Performance of Plant Extracts" Fushi Yu Fanghu, 2009, 30(2) 110-112 (Chinese) English Abstract Only.
Rahim, Afidah A; et al. "Recent Development of Vegetal Tannins in Corrosion Protection of Iron and Steel". Recent Patents on Material Science. 2008, 1(3) 223-231.
Subhashini, S. et al., "Eco-Friendly Corrosion Inhibitors from Poultry Waste for Mild Steel in Acid Medium". Material Science Research India. 2008, 5(2) 423-428. Abstract Only.
Kharchenko, U.V. et al., "Effects of Wastes Formed in Processing of Vegetable Raw Materials on the Corrosion of Steel in Corrosive Media", Russain Journal of Applied Chemistry, 2008, 18(9) 1559-1564. Abstract Only.
Youngmi Kim, et al. "Composition of Corn Dry-Grind Ethanol By-Products: DDGS, Wet Cake, and Thin Stillage", ScienceDirect, 2007.
Pacific Northwest Snowfighters, "Pacific Northwest Snowfighters Snow and Ice Control Chemical Products Specification and Test Protocols for the PNS Assocaition of British Columbia, Idaho, Montana, Oregon and Washington," 2006, Test Method B.
Colorado DOT, "Evvaluation of Alternative Anti-Icing and Deicing Compounds Unsing Sodium Choride and Magnesium Chloride as Baseline Deicers," DTD Applied Research and Innovation Branch Report No. CDOT-2009-1, Final Report. 2009.

\* cited by examiner

*Primary Examiner* — Anthony J Green
(74) *Attorney, Agent, or Firm* — Haugen Law Firm PLLP

(57) ABSTRACT

A corrosion inhibiting deicer composition includes an aqueous extract of corn stillage. The composition may be combined with a freezing point suppression agent to exhibit a freezing point of less than −35° C. The composition may be applied as a deicer to corrosion-susceptible materials without substantial risk of corrosion.

9 Claims, No Drawings

ANTI-CORROSIVE CORN EXTRACTS

CROSS-REFERENCE TO RELATED APPLICATIONS

This application claims priority to U.S. Provisional Patent Application Ser. No. 61/483,185, filed on May 6, 2011 and entitled "Anti-Corrosive Corn Extracts," the content of which being incorporated herein in its entirety.

FIELD OF THE INVENTION

This invention relates to corrosion inhibitors prepared as extracts from processed corn materials, which may also be useful as a de-icer.

BACKGROUND OF THE INVENTION

Ice and snow on roads and bridges can significantly slow traffic and increase danger to drivers. In addition to mechanical removal, chemical compounds are often used to prevent accumulation or aid removal of ice and snow from roadways. Chloride salts, whether in solid form, solution, or in admixture with sand and other substances, are commonly used to treat roadways to melt snow and ice. Sodium chloride salts especially are commonly used due to low cost and abundant supply. Most deicing compounds, however, are environmentally harmful. Further, chloride salts can significantly increase corrosion to metals in highway and bridge infrastructure and motor vehicles. Many salts also cause spalling in concrete structures, further damaging roadway infrastructure. Therefore, municipalities are often restricted in the amounts and types of substances that they may use to help remove snow and ice from roadways.

Considering the above problems associated with salt deicer formulations, there has been a continuing need for deicing compositions which can effectively melt snow and ice yet which reduce the corrosion and environmental contamination associated with conventional materials, especially if such compositions can be produced at costs competitive with incumbent salt based deicing products.

It is well known that agricultural by-products can be used as components of more environmentally friendly deicing products. These materials are generally complex mixtures that may enhance the freezing point reduction characteristics of conventional deicing compositions, and may also reduce their corrosiveness. Further, these agricultural by-products are generally biodegradable, environmentally benign, and inexpensive.

Conventional de-icing solutions which employ agricultural residues are typically extremely variable in composition, viscosity, film forming tendency, freezing temperature, and pH, and consequently give varying performance when used in de-icing solutions. Further, there may be practical difficulties associates with some of these ingredients and compositions such as stratification in storage, biological degradation, odor, plugging of filters and spray nozzles and environmental difficulties (e.g. high biological oxygen demand due to the very high organic content, and the presence of high phosphorus levels).

To improve quality and performance, and to meet current mandated standards, there is a continuing need for low cost materials, based on agricultural residuals and by-products, which exhibit improved de-icing performance, and reduce metal corrosion and spalling of concrete.

It is therefore an object of the present invention to provide deicing formulations which exhibit minimal corrosiveness, and which are based on low cost agricultural byproducts.

It is another object of the present invention to provide economical, highly effective deicing formulations.

SUMMARY OF THE INVENTION

By means of the present invention, cost-effective, corrosion inhibiting deicing compositions are provided by use of corn extracts produced from corn distillate residues obtained, for example, in the commercial production of ethanol from corn. In combination with other common ingredients, these extracts produce deicing formulations that meet regulatory standards for freezing point suppression and corrosion resistance.

DETAILED DESCRIPTION OF THE PREFERRED EMBODIMENTS

The objects, features, and advances represented by the present invention will now be presented in terms of detailed embodiments. Other embodiments and aspects of the invention are recognized as being within the grasp of those having ordinary skill in the art.

Two processes are primarily used for the production of ethanol from corn. In wet milling, the corn kernels are first soaked in an aqueous medium (often with added $SO_2$) for softening. The kernels are then crushed and fractionated. The starch fraction is then further treated with enzymes, breaking down the starch fraction to simple sugars, which are then fermented to ethanol. The major by-products of corn wet milling are steep liquor, corn gluten, germ meal, and fiber which are often incorporated in animal feed products.

Dry corn milling, in contrast, is a simpler process which is now most commonly used for dedicated corn to ethanol production facilities. In this process, the corn is ground (whole, or with some fractions mechanically removed and just the endosperm enriched fraction ground), heated with water and enzymes to break down the starch, followed by yeast fermentation. The resulting ethanol is distilled leaving whole stillage. The whole stillage is centrifuged into solid (distillers grains) and liquid (solubles, thin stillage) fractions. The liquid fraction may be concentrated (by drying) to thick stillage or condensed solubles. The solubles may be recombined with the distillers grains and dried to make distillers dried grains with solubles (DDGS). The compositions of these products vary with the feedstock and the exact process used, but general compositions have been studied. For the purposes hereof, the term "stillage" refers to whole stillage or fractions thereof.

The "solubles" fraction may be soluble at elevated process conditions, but a substantial portion of material precipitates at ambient temperatures to form a paste or slurry. This is especially true for condensed solubles. Such materials are difficult to use "as is" in deicing formulations due to difficulties in material handling. Thus, extractions may be employed to obtain components which remain in solution at ambient or cold temperature, and which surprisingly contributed to corrosion inhibition, freezing point suppression, or both, when incorporated in deicing formulations.

It was surprisingly found that aqueous ammonia extracts from distillers dried grains with solubles (DDGS) or from stillage/solubles fractions of corn ethanol production had very good properties for protection of steel from corrosion, especially as formulated in deicers. While the solubles sample (thick stillage) may contain higher concentrations of useful soluble components, it is somewhat more difficult to work with than the DDGS due to the need to refrigerate or freeze to prevent spoilage, its high viscosity, and its tendency to phase separate. Nevertheless, it is anticipated that useful deicing compositions may be created with extractables from thick corn stillage. Moreover, it is contemplated that any of the distillers grains, thin stillage, thick stillage solubles, or DDGS may be suitable sources for the active extracts of the present invention.

An example extraction to obtain the presently discovered corrosion-inhibiting active extracts may be performed with ammonium hydroxide, which creates an alkaline pH of 9-10, and may enhance the corrosion inhibition properties of the extracted materials. Other extraction media, however, are expected to be effective in obtaining the present active extracts. Example alternative extraction agents include hydroxides such as potassium hydroxide and sodium hydroxide, monoethanolamine, and other extraction materials, including those which produce an alkaline extraction. Possible means to increase the amount of extracted material from the sample include sonication, homogenation, and/or addition of surfactants. Treatment of the starting materials under conditions to induce partial hydrolysis (e.g. base or acid and high temperature, or enzyme treatments) may also increase the amount of extracted material.

Combinations of the prepared corn stillage product extracts with calcium chloride and propylene glycol were also shown to produce useful deicing formulations. Other additives such as sugars, other glycols (e.g. ethylene glycol), magnesium chloride, and the like, are expected to be useful in combination with the extracts of the present invention.

The active extracts of the present invention are preferably liquid at 20° C., and remain in liquid state to a freezing point below −35° C.

The following examples are provided to illustrate embodiments of the invention, but are not intended to limit the invention in any way.

EXAMPLES

PNS Test
1) Carbon steel coupons were cut so they were 4×4 cm, with a hanging hole in the middle. The edges of the panels were sanded with 240-grit silicon carbide abrasive paper. The coupons were then cleaned by rinsing in methanol, and the coupons were measured.
2) 300 mL of each of the following solutions were prepared in deionized water, and placed into a 500 mL flask. In addition, a flask was prepared that contained 300 mL of deionized water only, and this was set aside to be used later as the control.
   a. 3% NaCl
   b. 3% of each prepared solution
3) The coupons were hung from the frame of an automated dropper, and the electric timer of the dropper was set so that the panels were lowered and submerged in the solution for 10 minutes of each hour. The procedure was repeated for 72 hours.
4) After 72 hours, the coupons were removed from the solution, and washed under running tap water to remove any loosely adherent corrosion products. The panels are then placed into glass beakers containing cleaning acid. The cleaning acid was 2 parts HCl (36% in water) and 1 part deionized water, to which 5% (by weight) of S-11 (available from Cortec Corporation of St. Paul, Minn. was added to inhibit flash corrosion).
5) After cleaning, the panels were washed in DI water, dried, and weighed.
6) The weight loss of each coupon was determined by subtracting the final weight from the original weight. The corrosion rate, expressed as mils penetration per year (MPY) is found using the following formula:
   a. MPY=(weight loss (mg))(534)/((area of the metal coupon in cm$^2$)(exposure time)(metal density)). Density for carbon steel is 7.85 g/cc. The corrosion rate for the deionized water was then subtracted from the MPY for each of the test solution to ascertain a "corrected" corrosion rate.

A product was determined to pass the PNS test if the corrected corrosion value is 30% or less of the sodium chloride MPY. The corrected value of the extract product was divided by the corrected value of the salt solution, and multiplied by 100 to give percent.

Freezing Point Test
1) The samples were placed into a freezer set to −40° C.
2) After the samples had conditioned to the set temperature (at least 8 hours), the samples were removed and checked for signs of freezing.
3) If the samples were found to be frozen, the temperature of the freezer was adjusted to −35° C. The samples were then retested at −35° C., to determine if they would freeze at that temperature. If samples were frozen, the process was repeated, with the temperature raised in 5° C. intervals. The lowest temperature that the sample did not freeze at was then referred to as the freezing point.

Example 1

Producing Aqueous Extracts

The following formulations were prepared to produce a concentrated aqueous extract from corn stillage products:

| Formulation 1 | |
| --- | --- |
| Component | Concentration |
| DDGS | 1 part |
| Water | 4 parts |
| Ammonium Hydroxide Solution (30% by weight in water) | 1 part |

| Formulation 2 | |
| --- | --- |
| Component | Concentration |
| Thick Stillage | 2 parts |
| Water | 2 parts |
| Ammonium Hydroxide Solution (30% by weight in water) | 1 part |

The DDGS was obtained as a dry granular material.

The formulations were incubated for 40 hours at 80° C., and then filtered through cheesecloth with mechanical pressing to increase yield. Approximately 10% of the initial corn stillage product mass for each formulation was extracted into the aqueous solution. The resulting extract aqueous solutions had dissolved solids (non-volatile) content of approximately 11%, and demonstrated corrosion inhibition properties. The extracts were also found to be useful in deicing compositions, as described below.

Analysis of the extracts were attempted by using both gas chromatography (GC) and liquid chromatography (LC) coupled mass spectrometry techniques. For the GC analysis, the aqueous extract was further extracted with an organic solvent. This analysis identified primarily 16 and 18 carbon fatty acids, and a few minor peaks. The LC mass spectrometry data was less conclusive as to the chemical identity of the numerous peaks, however, some of the peaks appeared to be due to the above mentioned fatty acids.

Carbon steel panels (C-1010) were pre-weighed and immersed in the extract solutions, as diluted in tap water at 1% by weight, with the immersion being maintained for 24 hours at 21° C. Plain tap water was used as a control. After 24 hours, the panels were rinsed with tap water and the weight re-checked. For each test panel, the weight loss percent (WL) was calculated as 100×[(WS−WF)/WS], wherein WS=starting weight and WF=finished weight. The corrosion protection (%) was calculated as 100*[WLC−WLS)/WLC], wherein WLC=the weight loss of the test panel as tested with the control solution, and WLS=the weight loss of the test panel as tested in the diluted extract solutions.

The Formulation 1 extract solution showed 97.2% corrosion protection relative to the tap water control.

Example 2

Use of Extracts in De-Icing Compositions

The extract solutions of Example 1 were combined with other ingredients to produce demonstration deicing formulations. The extract solutions from Example 1 are identified under the "Stillage Extract" header of Table 1 below. The formulations were tested for corrosion inhibition under the PNS test protocol. Deicing compositions containing molasses or de-sugared molasses (raffinate) are included in Table 1 below for comparison. Compositions incorporating corn extracts and achieving freezing point and corrosion inhibition targets are shown in bold.

TABLE 1

| Water | CaCl2 | Ethylene Glycol | Propylene Glycol | Molasses | Raffinate | Stillage Extract | MPY | % NaCl | Freezing Point C. |
|---|---|---|---|---|---|---|---|---|---|
| 25% | | 50% | | | 25% | | 11.2 | 11.6 | −40 |
| 25% | | 25% | | 50% | | | 12.3 | 12.7 | −35 |
| 56% | 24% | | | | | 20%* | 18.56 | 29.6 | −35 |
| 25% | | | 50% | 25% | | | 3.95 | 7.6 | −35 |
| 25% | | | 50% | | | 25%* | 1.73 | 3.3 | −35 |
| 25% | | | 50% | | | 25%** | 0.07 | 0.13 | −35 |
| 25% | | | 35% | | 40%‡ | | 10.16 | 15.7 | −35 |

*= Formulation 1
**= Formulation 2
‡= sample of second raffinate source provided as CSB (concentrated separator byproduct)

The addition of calcium chloride ($CaCl_2$) or glycol was included to further suppress the freezing point, but no other additives were necessary to achieve the required corrosion inhibition. The present extracts are pale yellow in color, which is an advantage compared to the molasses/raffinate based compositions which are a very dark brown and have the potential to cause staining.

What is claimed is:

1. A corrosion inhibiting deicer composition, comprising an alkaline aqueous extract of corn stillage.

2. A corrosion inhibiting deicer composition as in claim 1 wherein said alkaline aqueous extract is pH 9-10.

3. A corrosion inhibiting deicer composition as in claim 1 wherein said alkaline aqueous extract is prepared by extracting corn stillage with ammonium hydroxide.

4. A corrosion inhibiting deicer composition as in claim 1 wherein said corn stillage is selected from DDGS or thick stillage.

5. A corrosion inhibiting deicer composition as in claim 1, including a freezing point suppression agent.

6. A method of preparing a corrosion inhibiting deicer composition, said method comprising:
   (a) adding an alkaline aqueous solvent to corn stillage to form an extraction mixture;
   (b) separating an aqueous extract solution from said extraction mixture; and
   (c) combining said aqueous extract solution with a freezing point suppression agent and water.

7. A method as in claim 6 wherein said corrosion inhibiting deicer composition is 20-25% by weight of said aqueous extract solution, and 24-50% by weight of said freezing point suppression agent.

8. A method as in claim 6 wherein said corrosion inhibiting deicer composition exhibits less than 30% of NaCl in a PNS test protocol, and a freezing point of less than −35° C.

9. A method as in claim 6 wherein said freezing point suppression agent is selected from the group consisting of calcium chloride, magnesium chloride, ethylene glycol, propylene glycol, and combinations thereof.

* * * * *